US012635054B2

(12) United States Patent
Liu et al.

(10) Patent No.: US 12,635,054 B2
(45) Date of Patent: May 19, 2026

(54) SETTING SYSTEM, SPACE CREATING SYSTEM, SETTING METHOD, AND PROGRAM

(71) Applicant: Panasonic Intellectual Property Management Co., Ltd., Osaka (JP)

(72) Inventors: Fei Liu, Osaka (JP); Hideo Nagahama, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 365 days.

(21) Appl. No.: 18/261,785

(22) PCT Filed: Dec. 2, 2021

(86) PCT No.: PCT/JP2021/044251
§ 371 (c)(1),
(2) Date: Jul. 17, 2023

(87) PCT Pub. No.: WO2022/163119
PCT Pub. Date: Aug. 4, 2022

(65) Prior Publication Data
US 2024/0298393 A1 Sep. 5, 2024

(30) Foreign Application Priority Data
Jan. 28, 2021 (JP) ................................. 2021-012423

(51) Int. Cl.
*H05B 47/105* (2020.01)
*G06T 15/50* (2011.01)
*H05B 47/175* (2020.01)

(52) U.S. Cl.
CPC .......... *H05B 47/105* (2020.01); *G06T 15/50* (2013.01); *H05B 47/1985* (2024.01)

(58) Field of Classification Search
CPC .... H05B 47/105; H05B 47/1985; G06T 15/50
(Continued)

(56) References Cited

U.S. PATENT DOCUMENTS

2009/0256483 A1* 10/2009 Gehman ............ H05B 41/3924
315/129
2018/0005195 A1* 1/2018 Jacobson ............... G05B 15/02
(Continued)

FOREIGN PATENT DOCUMENTS

CN 110709787 A 1/2020
JP H08-249921 A 9/1996
(Continued)

OTHER PUBLICATIONS

International Search Report dated Feb. 8, 2022 issued in International Patent Application No. PCT/JP2021/044251, with English translation.
(Continued)

*Primary Examiner* — Mohammad Ali
*Assistant Examiner* — Joshua T Sanders
(74) *Attorney, Agent, or Firm* — Rimon P.C.

(57) ABSTRACT

A setting system includes a setting input section, an image data generator, and a control data generator. The setting input section is configured to receive an input of setting data on a setting of operation of a plurality of facilities. The plurality of facilities includes a lighting fixture and a shielding apparatus. The image data generator is configured to render, based on model data, image data representing a light environment corresponding to the setting data of the building. The control data generator is configured to generate control data for executing control corresponding to the setting data over the plurality of facilities.

8 Claims, 8 Drawing Sheets

(58) Field of Classification Search
USPC .......................................................... 700/97
See application file for complete search history.

(56) References Cited

U.S. PATENT DOCUMENTS

| | | | | |
|---|---|---|---|---|
| 2018/0329617 A1* | 11/2018 | Jones | .................... | G01C 21/206 |
| 2020/0041968 A1* | 2/2020 | Baker | .................... | G06F 3/0482 |
| 2021/0104093 A1* | 4/2021 | Vincent | .................... | G06T 19/20 |

FOREIGN PATENT DOCUMENTS

| | | |
|---|---|---|
| JP | 2002-245102 A | 8/2002 |
| JP | 2017-215693 A | 12/2017 |
| WO | 2018/170317 A1 | 9/2018 |

OTHER PUBLICATIONS

Chinese Office Action dated Nov. 20, 2025 issued in the corresponding Chinese Patent Application No. 202180090673.9, with English translation.

* cited by examiner

SETTING SYSTEM, SPACE CREATING SYSTEM, SETTING METHOD, AND PROGRAM

CROSS-REFERENCE OF RELATED APPLICATIONS

This application is the U.S. National Phase under 35 U.S.C. § 371 of International Patent Application No. PCT/JP2021/044251, filed on Dec. 2, 2021, which in turn claims the benefit of Japanese Patent Application No. 2021-012423, filed on Jan. 28, 2021, the entire disclosures of which Applications are incorporated by reference herein.

TECHNICAL FIELD

The present disclosure generally relates to setting systems, space creating systems, setting methods, and programs. Specifically, the present disclosure relates to a setting system, a space creating system, a setting method, and a program which are configured to establish an environment of a building.

BACKGROUND ART

An example of a technique for establishing an environment of a building is a scene control switching device described in Patent Literature 1. The scene control switching device described in Patent Literature 1 includes a plurality of dimming circuits, a plurality of scene operation switches, and a control circuit. Each of the plurality of dimming circuits dims an associated one of illumination lamps corresponding to the plurality of dimming circuits. Each of the plurality of scene operation switches selects an associated one of lighting scenes set in the plurality of scene operation switches in advance. The control circuit controls each dimming circuit by an operation given to a corresponding one of the plurality of scene operation switches to obtain the lighting scenes corresponding to the corresponding one of the plurality of scene operation switches.

In the scene control switching device described in Patent Literature 1, for example, when an illumination lamp is installed, a user or the like has to adjust, for example, a set value of brightness of the illumination lamp for realizing a desired lighting scene (light environment) while the user checks the illumination lamp visually. As explained above, setting the light environment by the scene control switching device described in Patent Literature 1 is labor intensive.

CITATION LIST

Patent Literature

Patent Literature 1: JP H08-249921 A

SUMMARY OF INVENTION

It is an object of the present disclosure to provide a setting system, a space creating system, a setting method, and a program which are configured to reduce labor required to set a light environment.

A setting system according to an aspect of the present disclosure includes a setting input section, an image data generator, and a control data generator. The setting input section is configured to receive an input of setting data on a setting of operation of a plurality of facilities. The plurality of facilities are configured to be installed in a building and to establish an environment of the building. The plurality of facilities includes a lighting fixture and a shielding apparatus. The shielding apparatus is configured to automatically switch a shielding state with respect to outside light. The image data generator is configured to render, based on model data, image data representing a light environment corresponding to the setting data of the building. The model data includes three-dimensional data on a three-dimensional shape of the building and facility data on the plurality of facilities installed in the building. The control data generator is configured to generate control data for executing control corresponding to the setting data over the plurality of facilities.

A space creating system according to an aspect of the present disclosure includes the setting system, a design data generator, and a management data generator. The design data generator is configured to generate design data in accordance with the three-dimensional data on the three-dimensional shape of the building. The design data is data on a selection and an arrangement of the plurality of facilities, the selection and the arrangement being made such that the environment of the building satisfies a prescribed environmental standard. The management data generator is configured to generate management data in accordance with the design data and the facility data. The management data is data on management of the plurality of facilities. The image data generator is configured to render the image data by using the design data as at least part of the facility data.

A setting method according to an aspect of the present disclosure includes a setting input process, an image data generation process, and a control data generation process. The setting input process includes receiving an input of setting data on a setting of operation of a plurality of facilities. The plurality of facilities are configured to be installed in a building and to establish an environment of the building. The plurality of facilities includes a lighting fixture and a shielding apparatus. The shielding apparatus is configured to automatically switch a shielding state with respect to outside light. The image data generation process includes rendering, based on model data, image data representing a light environment corresponding to the setting data of the building. The model data includes three-dimensional data on a three-dimensional shape of the building and facility data on the plurality of facilities installed in the building. The control data generation process includes generating control data for executing control corresponding to the setting data over the plurality of facilities.

A program according to an aspect of the present disclosure is a program for causing one or more processors to execute the setting method.

DESCRIPTION OF EMBODIMENTS

A setting system, a space creating system, a setting method, and a program according to an embodiment will be described below with reference to the drawings. Note that the embodiment described below is a mere example of various embodiments of the present disclosure. The embodiment described below may be modified variously depending on design and the like as long as the object of the present disclosure is achieved. Moreover, figures described in the following embodiment are schematic views. The ratio of sizes and the ratio of thicknesses of components in the figures do not necessarily reflect actual dimensional ratios.

Embodiment

Overview

Figure 1:
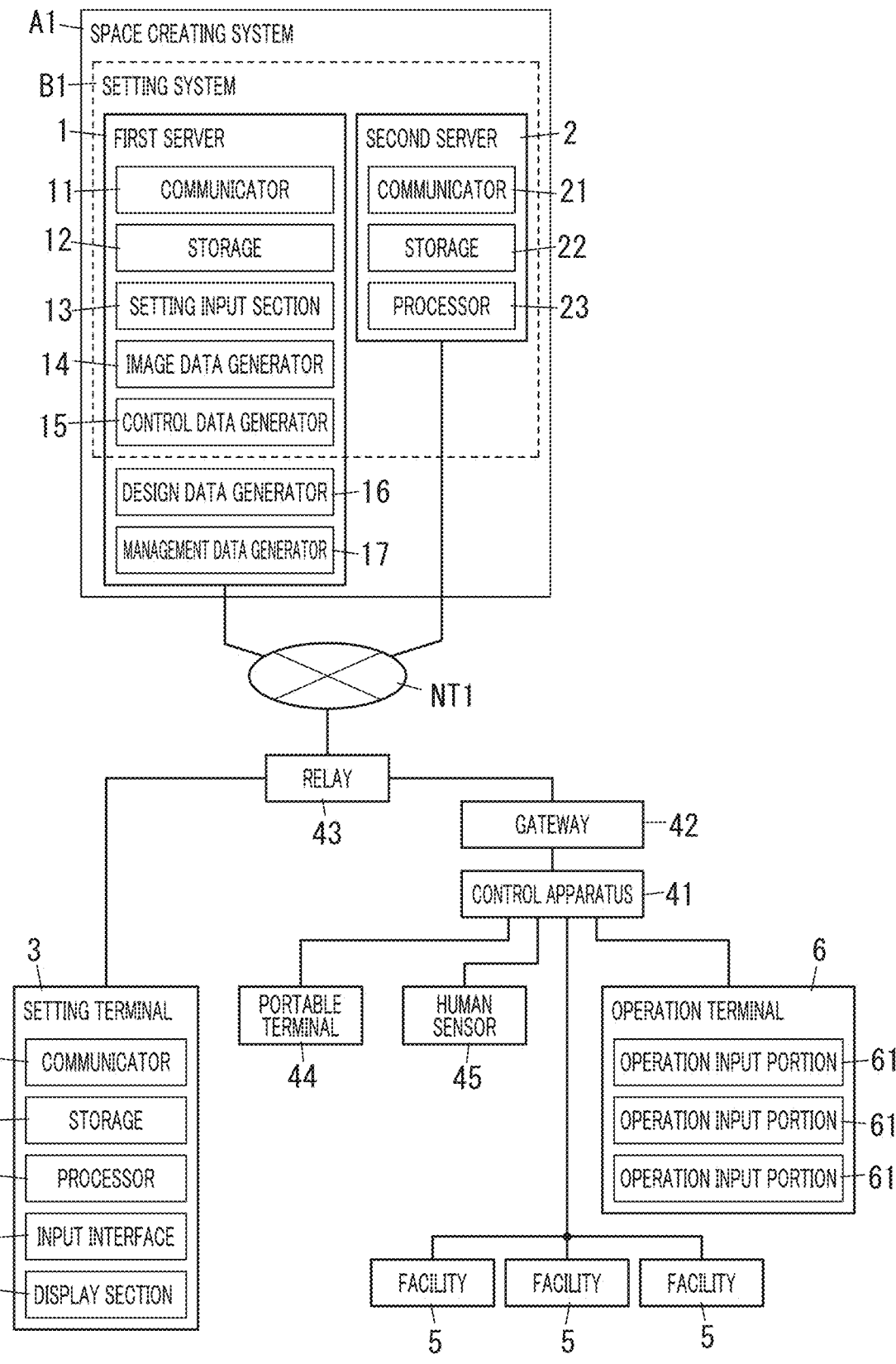
FIG. 1 is a block diagram of a system including a space creating system according to an embodiment.

A space creating system A1 shown in FIG. 1 performs a process relating to creation of an environment in a building. The environment in the building includes a light environment. That is, the space creating system A1 is used to create a comfortable space by adjusting, in the building, brightness of a lighting fixture 51 (see FIG. 2) in the building, a color temperature of the lighting fixture 51, and the like.

Specifically, the space creating system A1 generates design data on a selection and an arrangement of a plurality of facilities 5 to be installed in the building. Moreover, the space creating system A1 receives an input of setting data on a setting of operation of the plurality of facilities 5 and then generates control data. The control data is data for controlling the plurality of facilities 5. Moreover, the space creating system A1 generates management data on management of the plurality of facilities 5. The management data includes, for example, data on maintenance of the plurality of facilities 5. In this way, by the space creating system A1 designing, setting the operation of, and managing the plurality of facilities 5 in the building can be done in a one-stop manner.

Examples of the building in which the plurality of facilities 5 are to be installed include office buildings, factories, commercial complexes, libraries, art museums, museums, airports, rail stations, ballparks, hotels, hospitals, and dwelling houses. Other examples of the building in which the plurality of facilities 5 are to be installed include moving vehicles such as watercrafts and railway trains.

As shown in FIG. 1, the space creating system A1 includes a setting system B1 for setting the operation of the plurality of facilities 5. The setting system B1 is used, thereby realizing a light environment desired by a user. Moreover, the setting system B1 is used, thereby changing the light environment in accordance with a set schedule.

The setting system B1 includes a setting input section 13, an image data generator 14, and a control data generator 15. The setting input section 13 receives the input of the setting data on the setting of the operation of the plurality of facilities 5. The plurality of facilities 5 are installed in a building and establish an environment of the building. The plurality of facilities 5 includes a lighting fixture 51 (see FIG. 2) and a shielding apparatus 52 (e.g., electric curtain. See FIG. 2). The shielding apparatus 52 is configured to automatically switch a shielding state with respect to outside light. The image data generator 14 renders, based on model data, image data representing a light environment corresponding to the setting data of the building. The model data includes three-dimensional data on a three-dimensional shape of the building and facility data on the plurality of facilities 5 installed in the building. The control data generator 15 generates control data for executing control corresponding to the setting data over the plurality of facilities 5.

Moreover, a setting method of the present embodiment includes a setting input process, an image data generation process, and a control data generation process. The setting input process includes receiving an input of setting data on a setting of operation of the plurality of facilities 5. The plurality of facilities 5 are installed in a building and establish an environment of the building. The plurality of facilities 5 includes a lighting fixture 51 and a shielding apparatus 52. The shielding apparatus 52 is configured to automatically switch a shielding state with respect to outside light. The image data generation process includes rendering, based on model data, image data representing a light environment corresponding to the setting data of the building. The model data includes three-dimensional data on a three-dimensional shape of the building and facility data on the plurality of facilities 5 installed in the building. The control data generation process includes generating control data for executing control corresponding to the setting data over the plurality of facilities 5.

Moreover, a program of the present embodiment is a program for causing one or more processors to execute the setting method. The program may be stored in a non-transitory computer-readable recording medium.

The present embodiment allows a person (e.g., a user) who sets the light environment of the building to set the light environment with reference to the image data representing the light environment of the building. Therefore, the user or the like can set the light environment without going to an installation place of the facilities 5 to check the light environment. That is, the light environment can be set in a virtual space. This can reduce labor required to set the light environment.

(Details)

The configuration of the space creating system A1 and components used together with the space creating system A1 will be described further in detail below.

(1) Space Creating System

As shown in FIG. 1, the space creating system A1 includes the setting system B1, a design data generator 16, and a management data generator 17. The design data generator 16 generates the design data in accordance with the three-dimensional data on the three-dimensional shape of the building. The design data is data on a selection and an arrangement of the plurality of facilities 5, the selection and the arrangement being made such that an environment of the building satisfies a prescribed environmental standard. The management data generator 17 generates management data in accordance with the design data and facility data. The management data is data on management of the plurality of facilities 5. The image data generator 14 renders image data by using the design data as at least part of the facility data.

The space creating system A1 further includes a first server 1 and a second server 2. The first server 1 includes a communicator 11, a storage 12, the setting input section 13, the image data generator 14, the control data generator 15, the design data generator 16, and the management data generator 17. The communicator 11, the storage 12, the setting input section 13, the image data generator 14, and the control data generator 15 are included in the setting system B1, and the design data generator 16 and the management data generator 17 are not included in the setting system B1.

The second server 2 includes a communicator 21, a storage 22, and a processor 23. The second server 2 is included in the setting system B1.

The first server 1 and the second server 2 each include a computer system including one or more processors and memory. The processor(s) of the computer system executes a program stored in the memory of the computer system, thereby implementing at least some functions of the first server 1 and the second server 2. The program may be stored in the memory, may be provided over a telecommunications network such as the Internet, or may be provided by non-transitory recording medium, such as a memory card, storing the program.

In FIG. 1, the setting input section 13, the image data generator 14, the control data generator 15, the design data generator 16, and the management data generator 17 represent functions implemented by a processors of the first server 1 and do not necessarily represent tangible components.

The communicator 11 is a communication interface of the first server 1. The communicator 21 is a communication interface of the second server 2. The first server 1 is configured to communicate with other devices by using the communicator 11. The second server 2 is configured to communicate with other devices by using the communicator 21. As used in the present disclosure, "be configured to communicate" means that based on an appropriate communication scheme for wired communication or wireless communication, a signal can be transmitted and received directly, or indirectly over a network NTI or via a relay 43 or the like. The relay 43 is, for example, a WiFi (registered trademark) router. The communication scheme for the communicator 11 and the communicator 21 is a communication scheme compliant to, for example, the standard of Ethernet (registered trademark), or WiFi (registered trademark), or the like.

The storage 12 stores information necessary for processes in the first server 1.

The setting input section 13 receives an input of setting data transmitted from a setting terminal 3 which will be described later. Specifically, the setting input section 13 receives the input of the setting data transmitted from the setting terminal 3 and received by the communicator 11.

The image data generator 14, the control data generator 15, the design data generator 16, and the management data generator 17 will be described later.

The storage 22 of the second server 2 stores information necessary for processes in the second server 2. The storage 22 stores control data for the plurality of facilities 5. The control data stored in the storage 22 is data which has been generated by the control data generator 15 of the first server 1 and has been transmitted to the second server 2.

The processor 23 is a processor of the second server 2. The processor 23 performs various types of processes. For example, when a request signal for requesting the control data is transmitted from a control apparatus 41 which will be described later and the request signal is received by the communicator 21 of the second server 2, the processor 23 reads the control data corresponding to the request signal from the storage 22 and transmits the control data from the communicator 21 to the control apparatus 41.

As shown in FIG. 1, in the present embodiment, the components used together with the space creating system A1 are the setting terminal 3, the control apparatus 41, a gateway 42, a relay 43, a portable terminal 44, a human sensor 45, the plurality of facilities 5, and an operation terminal 6.

(2) Setting Terminal

The setting terminal 3 is a device for generating the setting data in accordance with an operation given by a user and transmitting the setting data thus generated to the first server 1. The setting terminal 3 is, for example, a personal computer, a mobile phone such as a smartphone, or an information terminal such as a tablet computer. In the present embodiment, the setting terminal 3 is supposed to be a personal computer. The setting terminal 3 includes a communicator 31, a storage 32, a processor 33, an input interface 34, a display section 35.

The communicator 31 is a communication interface of the setting terminal 3. The setting terminal 3 is configured to communicate with other devices by using the communicator 31. The communication scheme of the communicator 31 is a communication scheme compliant to, for example, the standard of Ethernet (registered trademark), or WiFi (registered trademark), or the like.

The storage 32 stores information necessary for processes in the setting terminal 3.

The processor 33 is a processor of the setting terminal 3. The processor 33 performs various types of processes. The processor 33 performs the processes in accordance with, for example, an operation given to the input interface 34 and a signal received by the communicator 31.

The input interface 34 includes, for example, at least one of a keyboard, a mouse, a button, a touch panel, or a touch panel display. A user gives an appropriate operation to the input interface 34, and thereby, the processor 33 generates the setting data.

The image data generated by the image data generator 14 of the first server 1 is received by the communicator 31, and the display section 35 displays an image corresponding to the image data. That is, the communicator 11 of the first server 1 corresponds to an output section configured to output, to a display terminal, the image data generated by the rendering by the image data generator 14. The setting terminal 3 corresponds to the display terminal which displays an image corresponding to the image data.

In addition, the display section 35 displays contents corresponding to the processes in the processor 33. The display section 35 is, for example, a display or a touch panel display. Note that the touch panel display of the input interface 34 may be used also as the display section 35.

(3) Control Apparatus

The control apparatus 41 includes a computer system including one or more processors and memory. The processor(s) of the computer system executes a program stored in the memory of the computer system, thereby implementing at least some functions of the control apparatus 41. The program may be stored in the memory, may be provided over a telecommunications network such as the Internet, or may be provided by non-transitory recording medium, such as a memory card, storing the program.

The control apparatus 41 is installed in, for example, an establishment including a building in which the plurality of facilities 5 are installed. The control apparatus 41 is configured to communicate with the second server 2. In the present embodiment, the control apparatus 41 communicates with the second server 2 via the gateway 42 and the relay 43. Moreover, the control apparatus 41 is configured to communicate with the portable terminal 44, the human sensor 45, the plurality of facilities 5, and the operation terminal 6. The communication scheme between the control apparatus 41 and the second server 2 is a communication scheme compliant to, for example, the standard of Ethernet (registered trademark), or WiFi (registered trademark), or the like.

The communication scheme of the control apparatus 41 to the portable terminal 44, the human sensor 45, the plurality of facilities 5, and the operation terminal 6 is, for example, WiFi (registered trademark), or Bluetooth (registered trademark) Low Energy.

The control apparatus 41 receives the control data from the second server 2 and controls the plurality of facilities 5 in accordance with the control data. Moreover, the control apparatus 41 receives pieces of information from the portable terminal 44, the human sensor 45, and the operation terminal 6 and controls the plurality of facilities 5 in accordance with the pieces of information.

(4) Portable Terminal

The portable terminal 44 is, for example, a mobile phone such as a smartphone or a tablet computer. A user selects, from a plurality of candidates of plurality of light environments registered in advance, a preferred light environment by using the portable terminal 44. In accordance with the preferred light environment, the control apparatus 41 controls the plurality of facilities 5, thereby implementing the light environment thus selected.

(5) Operation Terminal

The operation terminal 6 is, for example, a remote controller which controls the control apparatus 41. The operation terminal 6 includes a plurality of operation input portions 61. Of the plurality of operation input portions 61, at least one operation input portion 61 is assigned a prescribed control content. When a manual operation is given to the operation input portion 61, the control apparatus 41 controls the plurality of facilities 5 in accordance with the control contents assigned to the operation input portion 61.

(6) Human Sensor

The human sensor 45 is installed in the building. For example, the human sensor 45 is installed in an area (e.g., room) where the plurality of facilities 5 are installed, or on a pathway to the area. The control apparatus 41 controls the plurality of facilities 5 in accordance with the output from the human sensor 45. For example, when the human sensor 45 senses a person, the control apparatus 41 turns on the lighting fixture 51 included in the plurality of facilities 5.

(7) Plurality of Facilities

Figure 2:
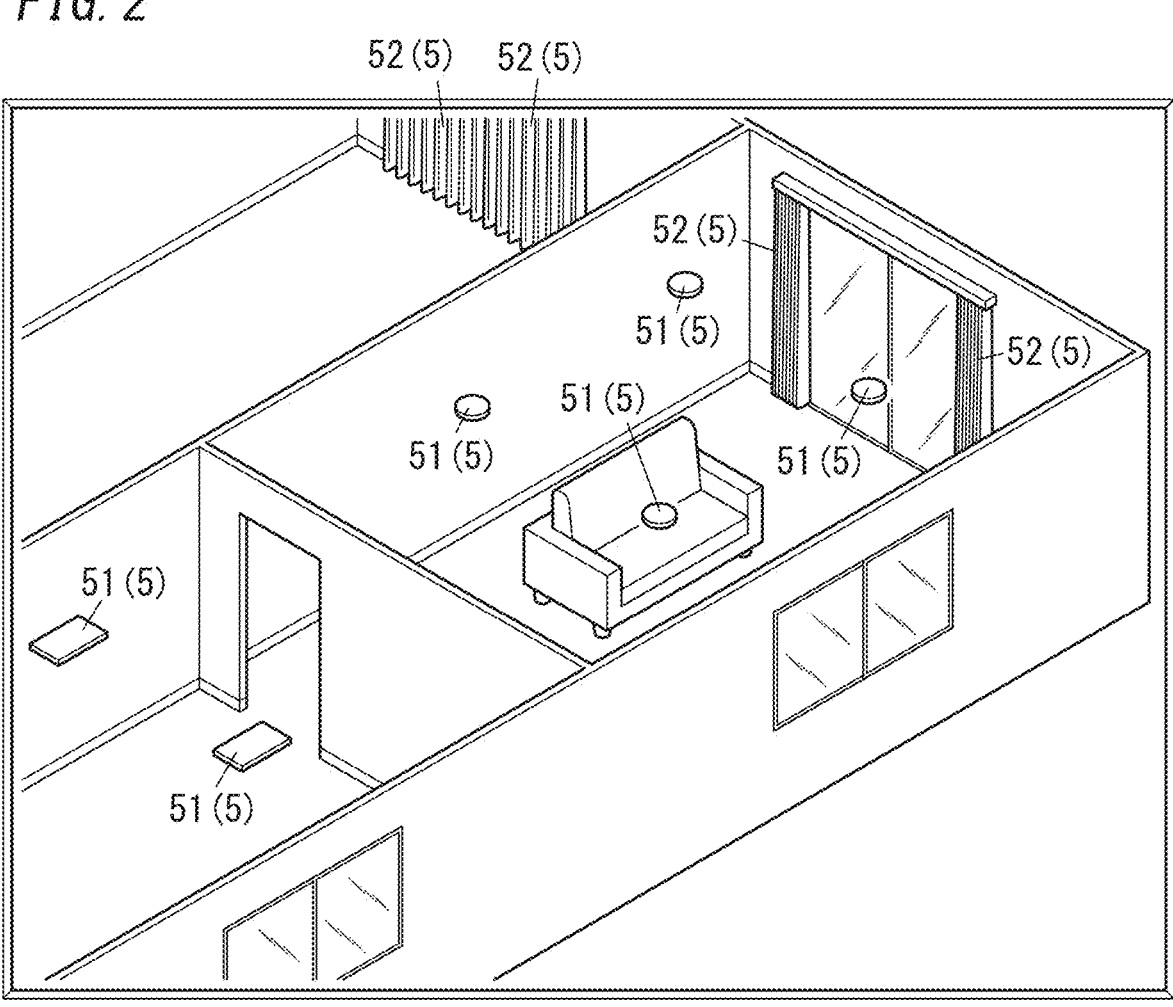
FIG. 2 is an illustrative view of a display image in the space creating system.

FIG. 2 shows part of an image displayed in the display section 35 of the setting terminal 3 when a user gives an operation to the setting terminal 3 and the setting terminal 3 thus generates the setting data. As shown in FIG. 2, the plurality of facilities 5 include at least one lighting fixture 51 and at least one shielding apparatus 52. In FIG. 2, there are a plurality of (six) lighting fixtures 51. Moreover, in FIG. 2, there are a plurality of (four) shielding apparatuses 52.

The lighting fixtures 51 may be installed on a ceiling, a floor, or a wall. The lighting fixtures 51 may be main lightings that directly illuminate the room or indirect lightings that illuminate the wall or the ceiling of the room. The lighting fixture 51 is, for example, a downlight, a ceiling lamp, or a base light.

The control apparatus 41 turns on and off a switch (relay) provided in an electric path between a power supply and the lighting fixtures 51, thereby switching the lighting fixtures 51 on and off. Moreover, the control apparatus 41 changes a current supplied from the power supply to the lighting fixtures 51, thereby changing the brightness of (dimming) the lighting fixtures 51.

Moreover, each lighting fixtures 51 includes: a plurality of first light-emitting diode elements having a first color temperature; and a plurality of second light-emitting diode elements having a second color temperature different from the first color temperature. The control apparatus 41 changes a ratio between the quantity of light of the plurality of first light-emitting diode elements and the quantity of light of the plurality of second light-emitting diode element, thereby changing the color temperature of the lighting fixture 51. Specifically, the control apparatus 41 changes the quantity of light of the plurality of first light-emitting diode elements and the quantity of light of the plurality of second light-emitting diode elements by at least one of: changing the number of light-emitting diode elements which are emitting light; or changing the quantity of light of individual light-emitting diode element.

The shielding apparatuses 52 of the present embodiment are electric curtains. Each shielding apparatus 52 includes a curtain and a motor which moves the curtain. Operation of the motor is controlled by the control apparatus 41. The motor is driven based on a command from the control apparatus 41, and thereby, the curtain moves. Thus, each shielding apparatus 52 is switchable between a closed state (see FIG. 3) where the curtain is closed to cover a window and an open state (see FIG. 4) where the curtain is open to uncover the window. That is, the curtain can be automatically opened and closed without a person opening and closing the curtain.

(8) Design Data Generator

The design data generator 16 of the first server 1 generates design data in accordance with the three-dimensional data on the three-dimensional shape of the building. The design data is data on a selection and an arrangement of the plurality of facilities 5, the selection and the arrangement being made such that an environment of the building satisfies a prescribed environmental standard. The three-dimensional data is stored in the storage 12 of the first server 1 in advance. When the three-dimensional data is represented as an image, the image is, for example, an image as shown in FIG. 2. Note that the three-dimensional data in an initial state includes no data (facility data) on the selection, the arrangement, and the like of the plurality of facilities 5. That is, in the initial state, the three-dimensional data includes no image data of the plurality of facilities 5. Moreover, in FIG. 2, the ceiling is shown in a transparent manner. The design data generator 16 integrates the facility data into the three-dimensional data, thereby generating model data including the three-dimensional data and the facility data as shown in FIG. 2. The model data of the present embodiment is Building Information Modeling (BIM) data.

The design data generator 16 acquires specification data on specifications of candidates of the plurality of facilities 5 in addition to the three-dimensional data. The specification data is stored in, for example, the storage 12 in advance.

A person who designs a building by using the space creating system A1 uses an information terminal (e.g., the setting terminal 3) such as a personal computer to input a design condition regarding the design. The design condition is, for example, a standard of a light environment which the building should satisfy. The design data generator 16 generates the design data in accordance with the three-dimensional data, the specification data, and the design condition. That is, the design data generator 16 obtains the selection and the arrangement of the plurality of facilities 5, the selection and the arrangement being made such that the light environment of the building satisfies the standard of the light environment input to the information terminal.

Note that the design condition is not limited to a condition regarding the light environment. For example, when the plurality of facilities 5 include an air conditioning apparatus, the design condition may be a condition regarding at least one of a room temperature, a humidity, an air volume, an air temperature, a wind direction, and Predicted Mean Vote (PMV) of the building. In this case, the design data generator 16 obtains at least the selection and the arrangement of the air conditioning apparatus included in the plurality of facilities 5.

Moreover, for example, when the plurality of facilities 5 include a filter which improves air quality, the design condition may be a condition regarding the air quality of the building. The condition regarding the air quality is, for example, a condition regarding at least one of a carbon dioxide concentration, a formaldehyde concentration, or a PM2.5 concentration in the air.

Note that the design data generator 16 may generate the design data further in accordance with meteorological data on a region in which the building is disposed. The meteorological data is, for example, data on the day length, the temperature, the humidity, and the like.

The setting terminal 3 downloads the design data from the first server 1 and displays information corresponding to the design data in the display section 35. Thus, a user can view the information corresponding to the design data. Note that this example is not limited to the setting terminal 3 but another apparatus may download the design data.

(9) Setting System

The setting input section 13 of the setting system B1 receives an input of the setting data. The setting data is data which sets the operation of the plurality of facilities 5.

That is, the user gives an operation to the setting terminal 3, and thereby, the processor 33 of the setting terminal 3 generates the setting data. The communicator 31 transmits the setting data to the first server 1. The operation given to the setting terminal 3 by the user and a response to the operation will be described below in further detail.

(9.1) Input of Setting Data

Figure 5:
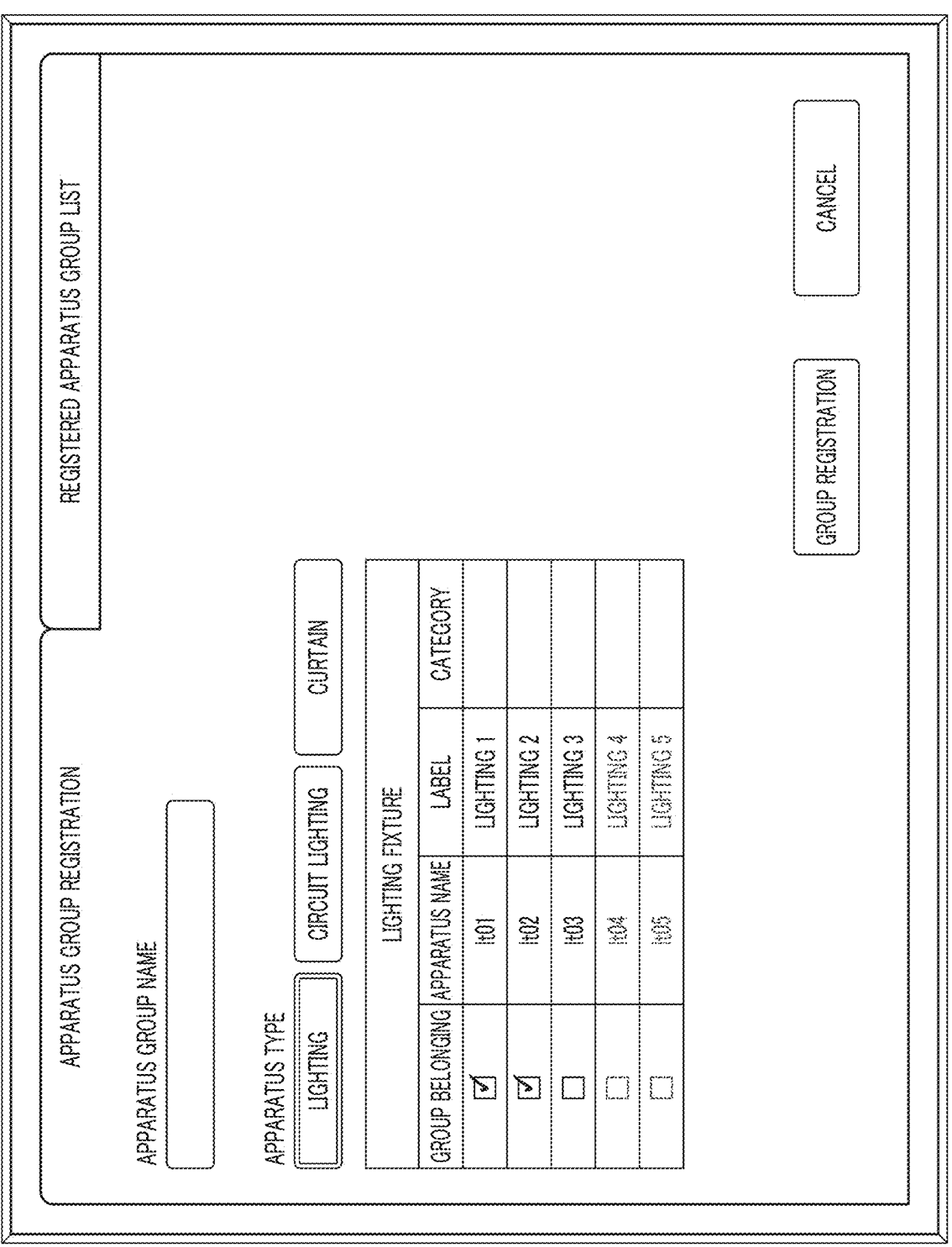
FIG. 5 is an illustrative view illustrating a setting screen of the space creating system.

The user gives the operation to the setting terminal 3, and thereby, the communicator 31 communicates with the communicator 11 of the first server 1. Thereby, a setting screen is displayed in the display section 35. The setting screen displays, for example, an image of the model data as shown in FIG. 2 and a list of the plurality of facilities 5 as shown in FIG. 5. The user gives the operation to the setting terminal 3, thereby inputting the setting data. An example of a procedure for inputting the setting data will be described below.

The setting data includes grouping data which groups the plurality of facilities 5. The user selects, from the image of the model data or the list, two or more facilities 5 as grouping targets. For example, as shown in FIG. 5, the list includes names of facilities 5 to be grouped, and checkboxes provided on one side of the names of the facilities 5. The user checks the checkboxes, thereby selecting two or more facilities 5. Then, the user inputs a group name, and gives an operation of confirming the grouping, and thereby, the two or more facilities 5 thus selected are grouped into one group. The operation of confirming the grouping is, for example, an operation of clicking a button with a text "GROUP REGISTRATION" displayed in the display section 35. Confirming the grouping corresponds to inputting the grouping data to the setting input section 13 of the first server 1 from the setting terminal 3. The storage 12 of the first server 1 stores, as the grouping data, information on the group thus confirmed.

The user may group some or all of the plurality of facilities 5 disposed in one room into one group or may group some or all of the plurality of facilities 5 disposed in a plurality of rooms into one group.

The same types of facilities 5 may be grouped into one group, or different types of facilities 5 may be grouped into a group. For example, one or more lighting fixtures 51, or one or more shielding apparatuses 52, or a combination thereof may be grouped into one group.

Moreover, as described later, the setting data includes time data on a time slot in which the lighting state of the plurality of lighting fixtures 51 is switched and a time slot in which the shielding state of the plurality of shielding apparatuses 52 is switched. That is, a time slot in which the plurality of facilities 5 are controlled is specified. In FIG. 5, the facilities 5 already belonging to another group in the same time slot are displayed in gray characters and are not selectable. Moreover, in FIG. 5, lighting fixtures 51 having item numbers different from these of the lighting fixtures 51 which have been selected are also displayed in gray characters and are not selectable.

Figure 6:
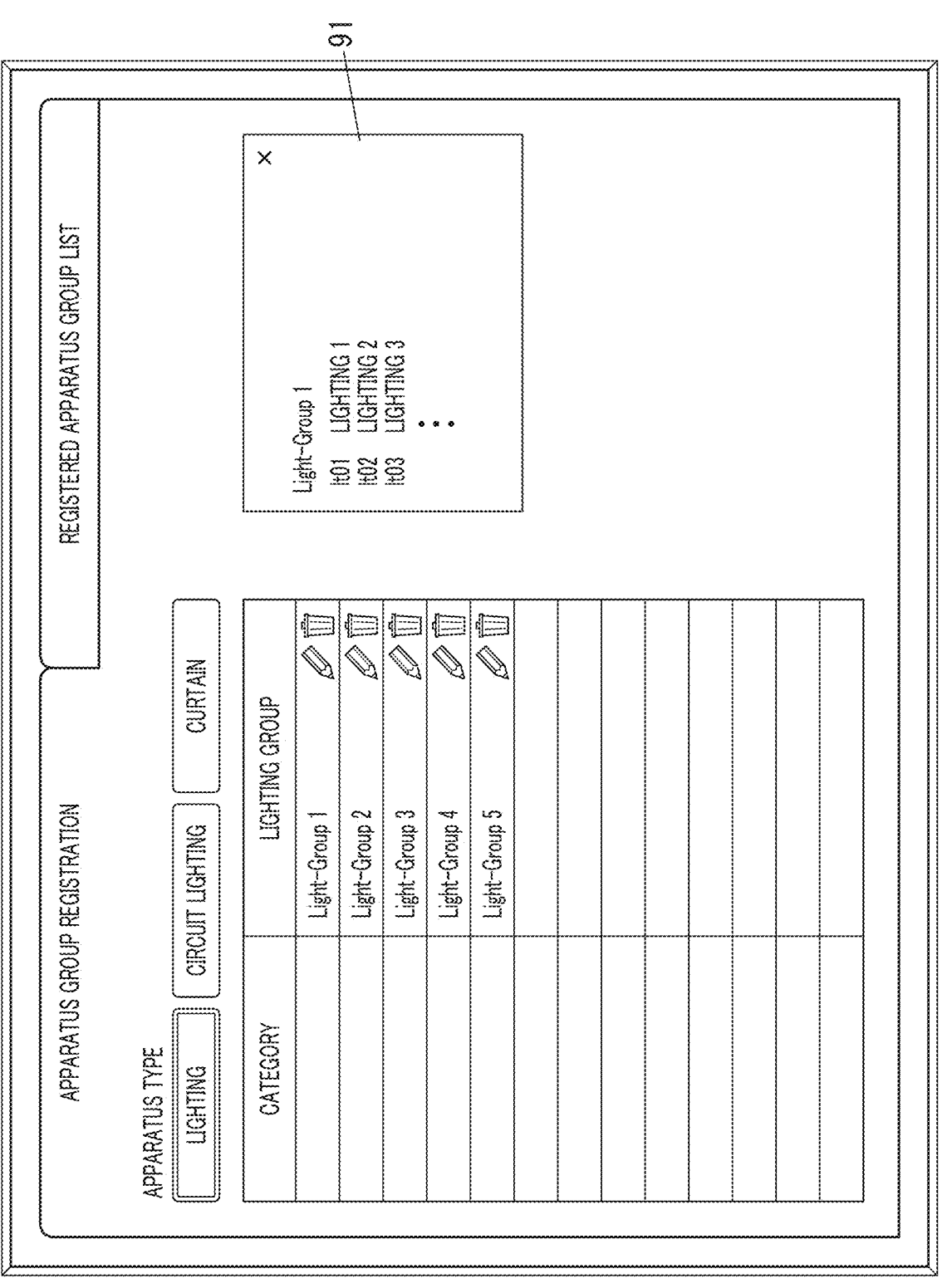
FIG. 6 is an illustrative view illustrating a setting screen of the space creating system.

As explained above, the two or more facilities 5 can be grouped into one group. In other words, a group including two or more facilities 5 can be registered. The user can register a plurality of groups. As shown in FIG. 6, the display section 35 can display a list of registered groups. Moreover, when a mouse cursor is placed on the name of a group of the registered groups, the facilities 5 belonging to the group is displayed in a list as shown in an area 91 in FIG. 6.

The user selects, from the list of the one or more registered groups, a group whose operation is to be set.

Figure 7:
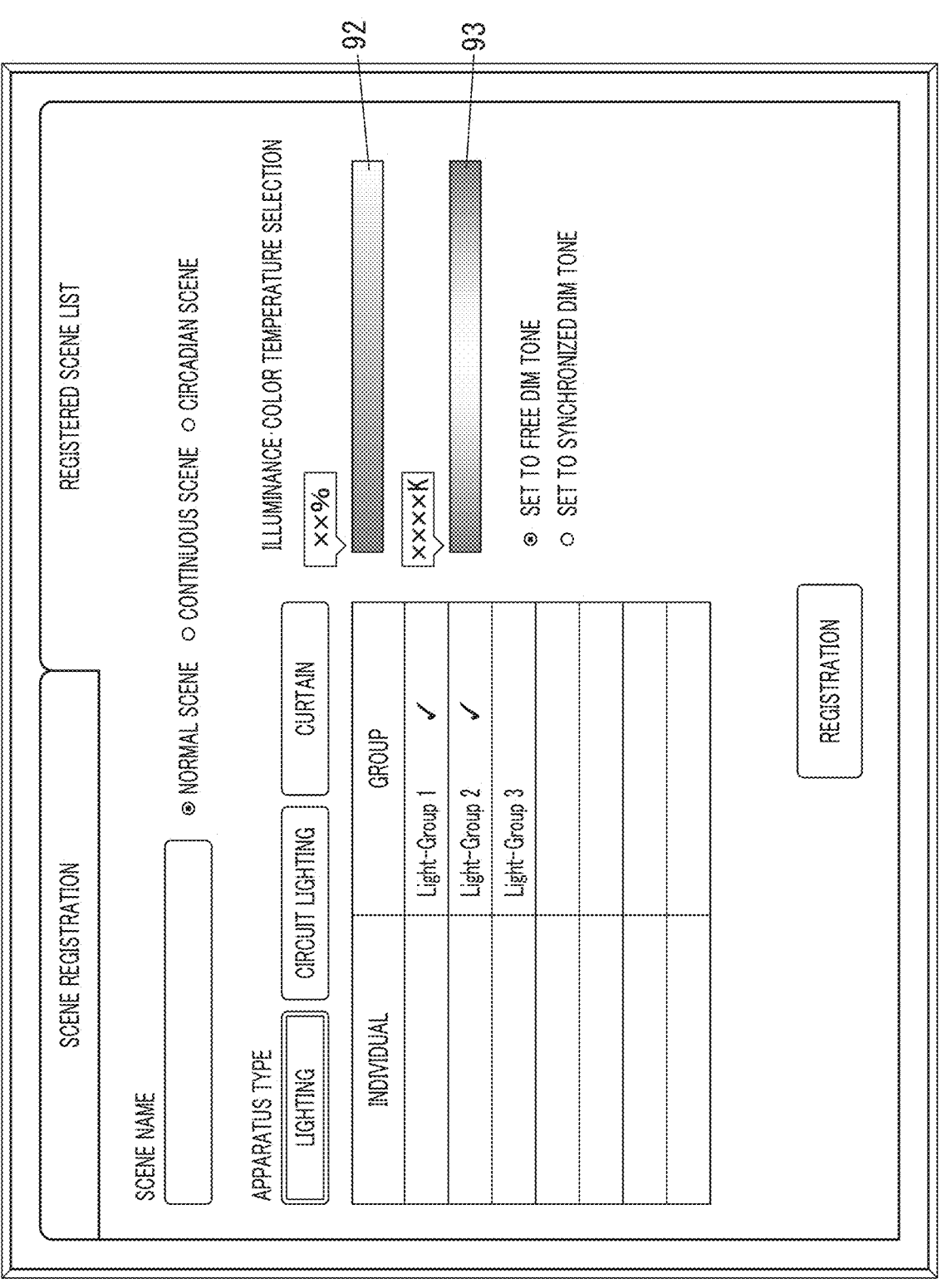
FIG. 7 is an illustrative view illustrating a setting screen of the space creating system.

The user specifies the illuminance and the color temperature of the lighting fixture 51 belonging to the group thus selected. In FIG. 7, a setting screen for specifying the illuminance and the color temperature is displayed by clicking a button with a text "LIGHTING". The illuminance and the color temperature may be specified by, for example, inputting numerical values, or as shown in FIG. 7, the illuminance and the color temperature may be specified by dragging sliders 92 and 93 displayed in the display section 35. Then, an operation of confirming the illuminance and the color temperature is given, thereby registering the illuminance and the color temperature of the group. The operation of confirming the illuminance and the color temperature is, for example, an operation of clicking a button with a text "REGISTRATION" displayed in the display section 35. Confirming the illuminance and the color temperature corresponds to inputting the setting data to the setting input section 13 of the first server 1 from the setting terminal 3. The storage 12 of the first server 1 stores information on the illuminance and the color temperature thus confirmed.

Moreover, the user specifies turning on and off of the lighting fixture 51 belonging to the group thus selected. In FIG. 7, a setting screen for specifying the turning on and off of the lighting fixture 51 is displayed by clicking a button with a text "CIRCUIT LIGHTING". Specifying turning on and off of the lighting fixture 51 corresponds to inputting the setting data to the setting input section 13 of the first server 1 from the setting terminal 3. The storage 12 of the first server 1 stores information on the turning on and off of the lighting fixture 51 thus specified.

Moreover, the user registers a shielding state of the shielding apparatus 52 belonging to the group thus selected. For example, the user registers whether the curtain of the shielding apparatus 52 is brought into an open state or into a closed state. In FIG. 7, a setting screen for registering the shielding state of the shielding apparatus 52 is displayed by clicking a button with a text "CURTAIN". Registering the shielding state of the shielding apparatus 52 corresponds to inputting the setting data to the setting input section 13 of the first server 1 from the setting terminal 3. The storage 12 of the first server 1 stores information on the shielding state of the shielding apparatus 52 thus registered.

Thus, inputting the setting data which sets the operation of the two or more facilities 5 belonging to the group is completed. The group for which the inputting of the setting data has been completed represents a scene corresponding to the setting data. The scene is a state of an environment (e.g., a light environment) established by the plurality of facilities 5. For example, when the illuminance of the plurality of lighting fixtures 51 belonging to a group is registered as full lighting illuminance, the group consequently represents a relatively bright scene.

The setting data on a group for which inputting of the setting data has been completed is hereinafter referred to as "registered setting data". The user can generate one or more pieces of registered setting data. Each piece of registered setting data includes information on a combination of the plurality of facilities 5 belonging to the group and a setting of the operation of each facility 5. Each piece of registered setting data is different from another piece of registered setting data in terms of at least one of the combination of the plurality of facilities 5 belonging to the group and the setting of the operation of each facility 5. For example, two pieces of registered setting data are compared with each other, and if the set value of the color temperature of the lighting fixture 51 is different therebetween, it can be concluded that the settings of the operation are different.

(9.2) Generation of Image Data

After the setting data is input to the setting input section 13, the image data generator 14 renders image data. The rendering refers to generating image data representing a three-dimensional image and, at that time, giving information on the brightness and the color to the image data. This gives a close-to-reality texture to the three-dimensional image. An image data formed by rendering includes, for example, information on a shadow of an object, information on the brightness on a surface of the object, and information on light reflection at a surface of the object.

A list of groups for which inputting the setting data has been completed is displayed in the display section 35. The user gives an operation to the setting terminal 3 to select a group (registered setting data) for which the rendering is to be performed. Then, the user performs an operation of starting the rendering, and thereby, the image data generator 14 starts rendering corresponding to the group. The image data (still image) generated by the rendering is to be displayed in the display section 35 of the setting terminal 3.

The image data generator 14 uses the three-dimensional data of the building as data for a basis of the rendering. The three-dimensional data includes no data on the light environment such as the illuminance and the color temperature in the building. The three-dimensional data is, for example, a model representing an object by using a contour line as shown in FIG. 2. Alternatively, the three-dimensional data may be a wire frame model.

Moreover, the image data generator 14 executes the rendering in accordance with the facility data. The facility data is data on the plurality of facilities 5. The facility data includes the design data generated by the design data generator 16. The facility data may be consistent with the design data or may be data obtained by editing the design data. The facility data is, for example, data on the arrangement, the orientation, the adjustment range of illuminance, and the adjustment range of color temperature of each facility 5.

That is, the image data generator 14 executes the rendering in accordance with the model data including the three-dimensional data and the facility data. More specifically, the image data generator 14 renders the image data representing the light environment corresponding to the setting data of the building.

When the user selects a group and performs the operation of starting the rendering, the image data generator 14 performs the rendering such that the setting data of the group is reflected.

Figure 3:
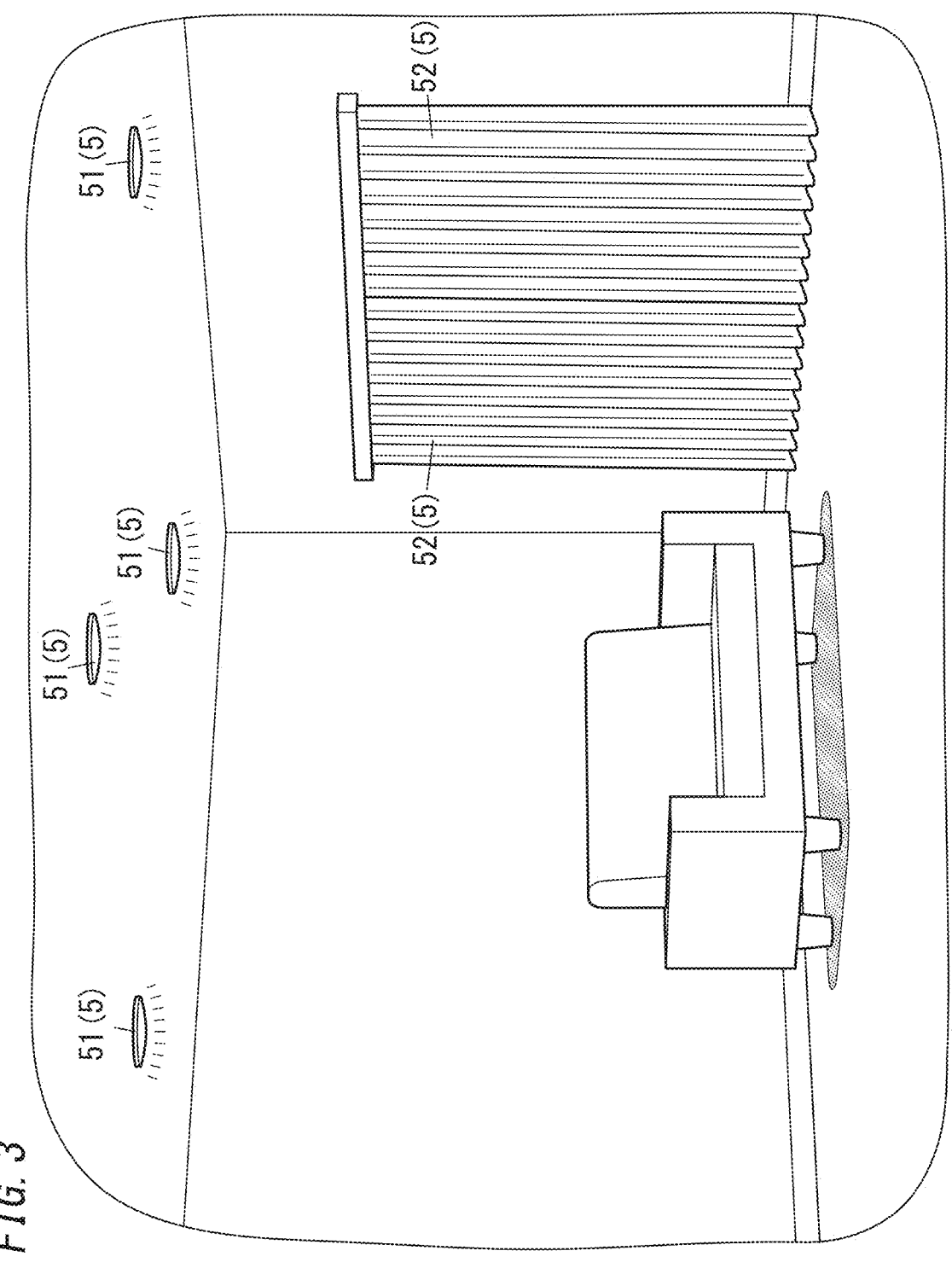
FIG. 3 is an illustrative view of an image generated by the space creating system.

As an example, according to setting data of a group, the illuminance of the plurality of lighting fixtures 51 is supposed to be the illuminance of full lighting and the state of the plurality of shielding apparatuses 52 is a "closed state". In this case, image data as shown in FIG. 3 is generated. That is, image data is generated which represents a light environment in a state where the illuminance of the plurality of lighting fixtures 51 is the illuminance of full lighting and the state of the plurality of shielding apparatuses 52 is the "closed state".

Figure 4:
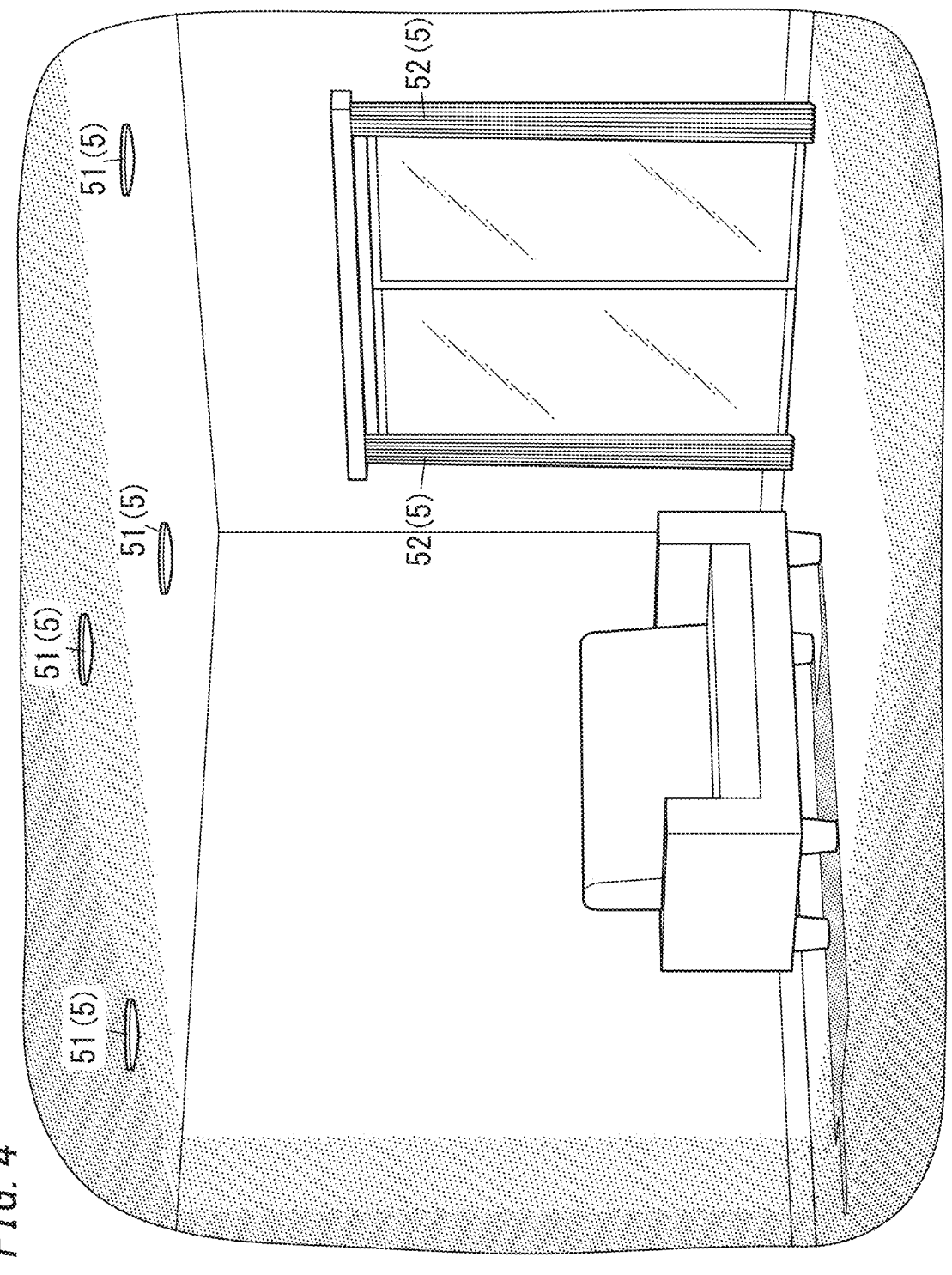
FIG. 4 is an illustrative view of an image generated by the space creating system.

As another example, according to setting data of a group, the lighting state of the plurality of lighting fixtures 51 is supposed to be "dimming ratio 30%" and the state of the plurality of shielding apparatuses 52 is supposed to be the "open state". In this case, image data as shown in FIG. 4 is generated. That is, image data is generated which represents a light environment of a state where the lighting state of the plurality of lighting fixtures 51 is "dimming ratio 30%" and the state of the plurality of shielding apparatuses 52 is the "open state".

When FIGS. 3 and 4 are compared with each other, the light environment in the room is different in accordance with the difference in terms of the lighting state of the plurality of lighting fixtures 51 and the open/close state of the plurality of shielding apparatuses 52. That is, in FIG. 3, the illuminance of the plurality of lighting fixtures 51 is high as compared with FIG. 4, and thus, the interior of the room is uniformly illuminated. Moreover, in FIG. 4, the state of the plurality of shielding apparatuses 52 is the "open state" unlike FIG. 3, and therefore, outside light enters the room through a window.

Here, the setting data includes time data on a time slot in which the lighting state of the (plurality of) lighting fixture(s) 51 is switched and a time slot in which the shielding state of the (plurality of) shielding apparatus(es) 52 is switched. Moreover, the image data generator 14 generates, based on the time data, a moving image representing a time change in the light environment corresponding to the setting data of the building. For example, in the example shown in FIG. 3, the time slot is set to night (e.g., 18:00 to 6:00 the next day). In the example shown in FIG. 4, the time slot is set to morning (e.g., 6:00 to 8:00). Moreover, besides the image data of each of FIGS. 3 and 4, image data for which the time slot is set to daytime (e.g., 8:00 to 18:00) is generated. Those pieces of image data are referred to as first image data, second image data, and third image data. The first image data, the second image data and the third image data are each data generated by rendering. Moreover, pieces of registered setting data corresponding to the first image data, the second image data, and the third image data are referred to as first registered setting data, second registered setting data, and third registered setting data. The user gives an operation to the setting terminal 3, thereby selecting the first registered setting data, the second registered setting data, and the third registered setting data, specifies respective time zones for executing control corresponding to the respective pieces of registered setting data, and temporarily registers these pieces of information as a schedule for the plurality of facilities 5. Thus, the image data generator 14 generates, for example, a frame-by-frame moving image of the first image data, the second image data, and the third image data. The moving image is displayed in the display section 35. The user views the moving image, thereby easily grasping the time change in the light environment of the building. The user references the moving image to determine whether or not the schedule for controlling the plurality of facilities 5 is appropriate, and if appropriate, the user registers the schedule. The first registered setting data, the second registered setting data, and the third registered setting data are preferably in common in terms of the group.

Moreover, when the state of the plurality of shielding apparatuses 52 is the "open state", the quantity of outside light entering through the window is different for each time. Thus, as shown in FIG. 4, the time data is reflected in the image data generated by the image data generator 14. For example, the plurality of shielding apparatuses 52 are supposed to be installed at a window oriented southward. In this case, in the image data generated by the image data generator 14, the quantity of outside light entering through the window is relatively large when the time slot is set to the daytime, whereas the quantity of the outside light entering through the window is relatively small when the time slot is set to the morning or the evening.

(9.3) Generation of Control Data

After the image data generator 14 performs the rendering, the user registers the schedule of controlling the plurality of facilities 5, and then, the control data generator 15 generates the control data. The control data is data for executing control corresponding to the setting data over the plurality of facilities 5.

More specifically, the user registers one or more schedules, and then, the control data generator 15 generates the control data. The control data generator 15 transmits the control data via the communicator 11 to the second server 2. The storage 22 of the second server 2 stores the control data.

The user gives an operation to the portable terminal 44, and thereby, a list of the schedules thus registered is displayed in a display section (display) of the portable terminal 44. The user selects a schedule. When the schedule is selected, the portable terminal 44 communicates with, and transmits a command signal to, the control apparatus 41. When the control apparatus 41 receives the command signal, the control apparatus 41 requests control data from the second server 2. The second server 2 transmits, in response to the request from the control apparatus 41, the control data corresponding to the schedule thus selected to the control apparatus 41. The control apparatus 41 stores the control data in memory of the control apparatus 41. The control apparatus 41 controls operation of the plurality of facilities 5 in accordance with the control data. Thus, the plurality of facilities 5 are controlled in accordance with the schedule. That is, in each time slot, the control apparatus 41 executes control corresponding to the setting data over the plurality of facilities 5.

That is, the communicator 21 of the second server 2 transmits the control data to the control apparatus 41 installed in the building. When the control apparatus 41 receives the control data, the control apparatus 41 executes control corresponding to the setting data over the plurality of facilities 5.

A component that transmits the command signal is not limited to the portable terminal 44, but the command signal may be transmitted from the setting terminal 3, the operation terminal 6, or any other apparatus (e.g., a panel remote controller installed in the building) to the control apparatus

41. Moreover, the portable terminal 44, the setting terminal 3, the operation terminal 6, or any other apparatus may request the control data from the second server 2 without using the control apparatus 41.

Thus, the control apparatus 41 can download the control data from the second server 2 and control the plurality of facilities 5 in accordance with the schedule corresponding to the control data. The control data may be downloaded only once at the time of initial setting, regularly, or irregularly.

On the other hand, the control apparatus 41 can also control the plurality of facilities 5 by downloading control data representing control contents other than the schedule. Detailed description will be given below.

The control data includes specifying data. The specifying data is data specifying a specific operation input portion 61 of the plurality of operation input portions 61 of the operation terminal 6. Here, a piece of specific registered setting data of a plurality of pieces of registered setting data is assigned to the specifying data. The control apparatus 41 downloads the specifying data from the second server 2 and stores the specifying data in the memory of the control apparatus 41.

To the plurality of operation input portions 61, manual operations are given. When the manual operations are given to the operation input devices 61, the operation terminal 6 transmits a signal to the control apparatus 41. Depending on which operation input portion 61 of the operation input portions 61 has received the manual operation, a signal transmitted from the operation terminal 6 to the control apparatus 41 differs. When the manual operation is given to the specific operation input portion 61 specified by the specifying data, the control apparatus 41 executes control corresponding to the specific registered setting data assigned to the specifying data over the plurality of facilities 5. That is, the operation terminal 6 executes control corresponding to the control data over the plurality of facilities 5 via the control apparatus 41.

A manual operation may be given to the specific operation input portion 61 switch the schedule. That is, the schedule may be assigned to the specifying data.

Note that the control data generator 15 generates the control data for collectively controlling the two or more facilities 5 grouped into one group by the grouping data of the plurality of facilities 5. That is, the two or more facilities 5 grouped into one group is synchronously controlled. For example, the lighting states of the two or more lighting fixtures 51 which are synchronously controlled simultaneously vary, and the two or more shielding apparatuses 52 which are synchronously controlled are opened and closed simultaneously with a change in the lighting state of the two or more lighting fixtures 51. Alternatively, a case where the states of the plurality of facilities 5 are sequentially changed with a time difference set for each facility 5 is also referred to that the plurality of facilities 5 are synchronously controlled. For example, a case where a few seconds after dimming a lighting fixture 51, another lighting fixture 51 is dimmed, a few seconds after which, still another lighting fixture 51 is dimmed is also referred to that the plurality of lighting fixtures 51 are synchronously controlled.

Note that the control apparatus 41 may control the plurality of facilities 5 in accordance with a sensing result by the human sensor 45 in addition to the control data. For example, while the human sensor 45 detects no person, the control apparatus 41 may turn off the plurality of lighting fixtures 51 regardless of the contents of the control data. Moreover, while the human sensor 45 detects no person, the control apparatus 41 may perform control in accordance with prescribed registered setting data.

Note that the control data is not limited to data for controlling the lighting fixture 51 and the shielding apparatus 52. For example, the control data may include data for controlling an air conditioning apparatus included in the plurality of facilities 5. Alternatively, the control data may include data for controlling a filter which improves the quality of air and which is included in the plurality of facilities 5.

(10) Management Data Generator

The management data generator 17 generates management data in accordance with the design data and facility data. The management data is data on management of the plurality of facilities 5. The management data includes, for example, data on maintenance of the plurality of facilities 5.

The management data generator 17 references usage data logs of the plurality of lighting fixtures 51 to obtain a deterioration state, a replacement timing, and estimated illuminance of the plurality of lighting fixtures 51. The usage data logs include information on, for example, a dimming state and a used time of the plurality of lighting fixtures 51. The communicator 11 of the first server 1 transmits information on, for example, the deterioration state, the replacement timing, and the estimated illuminance of the plurality of lighting fixtures 51 as the management data.

Moreover, the management data generator 17 references a usage data log of the air conditioning apparatus included in the plurality of facilities 5, thereby obtaining a deterioration state, a filter cleaning timing, and estimated room temperature of the air conditioning apparatus. The usage data log includes information on, for example, an operation state and a usage time of the air conditioning apparatus. The communicator 11 of the first server 1 transmits the information on the deterioration state, the filter cleaning timing, and the estimated room temperature of the air conditioning apparatus as the management data.

The usage data log may include output data of a sensor which senses the state of the plurality of facilities 5.

The setting terminal 3 downloads the management data from the first server 1 and displays information corresponding to the management data in the display section 35. Thus, the user can manage the plurality of facilities 5. Note that a terminal that downloads the management data is not limited to the setting terminal 3, but any other apparatus may download the management data.

(11) Setting Method

Figure 8:
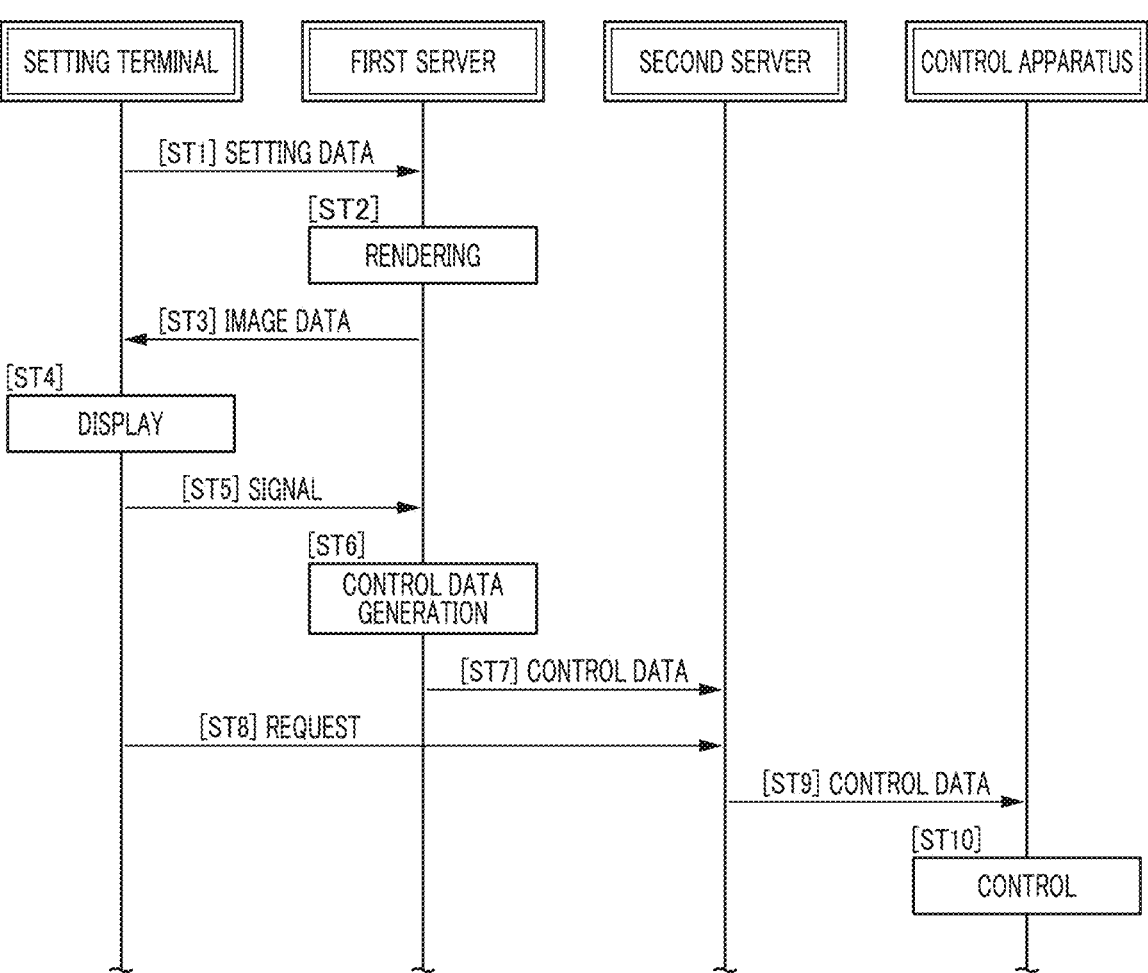
FIG. 8 is a sequence diagram of an operation example of the space creating system.

A setting method implemented by the setting system B1 will be described below with reference FIG. 8. Note that the sequence diagram shown in FIG. 8 is a mere example of the setting method according to the present disclosure, and the order of processes may accordingly be changed or a process (es) may accordingly be added or omitted.

The user gives an operation to the setting terminal 3. In response to the operation, the setting terminal 3 transmits the setting data to the first server 1 (step ST1). The setting data groups the two or more facilities 5 and also specifies control contents and a control time of each facility 5.

The image data generator 14 of the first server 1 references the setting data to perform rendering (step ST2). Thus, the light environment corresponding to the setting data of the building is simulated. Moreover, image data representing a result of the simulation is transmitted to the setting terminal 3 (step ST3) and is displayed in the display section 35 of the setting terminal 3 (step ST4).

The user references an image (image corresponding to the image data) displayed in the display section 35 to give an operation of confirming a schedule of controlling the plurality of facilities 5. Then, the setting terminal 3 transmits a prescribed signal to the first server 1 (step ST5). When the first server 1 receives the prescribed signal, the first server 1 generates the control data (step ST6). The first server 1 transmits the control data to the second server 2 (step ST7). The storage 22 of the second server 2 stores the control data.

The user gives an operation to, for example, the setting terminal 3 or the portable terminal 44 to request the control data from the second server 2 (step ST8). Then, the second server 2 transmits the control data to the control apparatus 41 (step ST9). When the control apparatus 41 receives the control data, the control apparatus 41 controls the plurality of facilities 5 in accordance with the control data (step ST10).

According to the setting method of the present embodiment, a person (e.g., a user) who sets the light environment of the building references the image displayed in the display section 35, thereby being informed of the light environment to be established. Therefore, a user or the like can set the light environment without adjusting the states of the actual plurality of facilities 5 one by one. The light environment is easily set as compared with, for example, the case where the user or the like adjusts the dimming ratios of the actual lighting fixtures 51 one by one to check an appropriate dimming rate. This can reduce labor required to set the light environment. In addition, the light environment can be set remotely, which can thus omit labor required for the user or the like to go to the installation place of the plurality of facilities 5. Moreover, as compared with the case where the light environment is set at the installation place of the plurality of facilities 5, the work time at the installation place of the plurality of facilities 5 can be reduced.

Variations of Embodiment

Variations of the embodiment will be enumerated below. The variations described below may be implemented accordingly in combination with each other.

The shielding apparatus 52 is not limited to the electric curtain. The shielding apparatus 52 is, for example, an apparatus which is electrically driven to switch the shielding state with respect to the outside light and may be, a window shade, bamboo screen, a roll screen, or a storm sash. Moreover, the shielding apparatus 52 may be, for example, an apparatus which uses air pressure or fluid pressure as a power source.

In the embodiment, it has been described that the schedule of controlling the plurality of facilities 5 is registered. In contrast, control independent of the time may be registered. For example, as shown in FIG. 3, control for the illuminance of the plurality of lighting fixtures 51 being the illuminance of full lighting and the state of the plurality of shielding apparatuses 52 being the "closed state" may be registered. Then, an operation may be given to, for example, the portable terminal 44, thereby causing the control apparatus 41 to execute the control.

In the embodiment, the schedule of control of the plurality of facilities 5 is a schedule based on the cycle of one day but is not limited to this example. For example, the schedule may be based on the cycle of one week, one month, or one year.

The control based on the control data may execute: fade-in dimming of gradually increasing the illuminance of the lighting fixture 51 from a non-lighting level; or fade-out dimming of gradually reducing the illuminance of the lighting fixture 51 and turning off the lighting fixture 51.

Illuminances of only some lighting fixtures 51 of the plurality of lighting fixtures 51 may be changed. Moreover, color temperatures of only some lighting fixtures 51 of the plurality of lighting fixtures 51 may be changed. The lighting fixtures 51, whose illuminances and color temperatures are not allowed to be changed, may be controlled, based on the setting data, in terms of only turning on and off thereof.

A display terminal which displays an image corresponding to the image data generated by the rendering by the image data generator 14 is not limited to the setting terminal 3. The display terminal may be, for example, a display connected to the first server 1. Alternatively, the display terminal may be the portable terminal 44.

The space creating system A1 in the present disclosure includes a computer system. The computer system includes a processor and memory as hardware main components. The processor may execute a program stored in the memory of the computer system, thereby implementing at least some of functions of the space creating system A1 in the present disclosure. The program may be stored in the memory of the computer system, may be provided over a telecommunications network, or may be provided by non-transitory computer-readable recording medium, such as a memory card, an optical disk, or hard disk drive, storing the program. The processor of the computer system includes one or a plurality of electronic circuits including semiconductor integrated circuits (IC) or large-scale integrated circuits (LSI). The integrated circuit such as IC or LSI mentioned herein may be referred to in another way, depending on the degree of the integration and includes integrated circuits called system LSI, very-large-scale integration (VLSI), or ultra-large-scale integration (ULSI). A field-programmable gate array (FPGA), which is programmable after fabrication of the LSI, or a logical device which allows reconfiguration of connections in LSI or reconfiguration of circuit cells in LSI may be adopted as the processor. The plurality of electronic circuits may be collected on one chip or may be distributed on a plurality of chips. The plurality of chips may be collected in one device or may be distributed in a plurality of devices. As mentioned herein, the computer system includes a microcontroller including one or more processors and one or more memories. Thus, the microcontroller is also composed of one or more electronic circuits including a semiconductor integrated circuit or a large-scale integrated circuit.

Moreover, collecting the plurality of functions in the space creating system A1 in one device is not an essential configuration for the space creating system A1, but the components of the space creating system A1 may be distributed in a plurality of devices. Further, at least some of the functions of the space creating system A1, for example, some functions of the first server 1 and the second server 2 may be implemented by, for example, cloud (cloud computing).

In contrast, in the embodiment, at least some functions of the space creating system A1 which are distributed in the plurality of devices may be collected in a single device. For example, some functions of the space creating system A1 which are distributed in the first server 1 and the second server 2 may be collected in a single device (e.g., a server).

SUMMARY

The embodiment and the like described above disclose the following aspects.

A setting system (B1) of a first aspect includes a setting input section (13), an image data generator (14), and a control data generator (15). The setting input section (13) is configured to receive an input of setting data on a setting of operation of a plurality of facilities (5). The plurality of facilities (5) are configured to be installed in a building and to establish an environment of the building. The plurality of facilities (5) include a lighting fixture (51) and a shielding apparatus (52). The shielding apparatus (52) is configured to automatically switch a shielding state with respect to outside light. The image data generator (14) is configured to render, based on model data, image data representing a light environment corresponding to the setting data of the building. The model data includes three-dimensional data on a three-dimensional shape of the building and facility data on the plurality of facilities (5) installed in the building. The control data generator (15) is configured to generate control data for executing control corresponding to the setting data over the plurality of facilities (5).

This configuration allows a person (e.g., a user) who sets the light environment of the building to set the light environment with reference to the image data representing the light environment of the building. Therefore, the user or the like can set the light environment further without going to an installation place of the facilities (5) to check the light environment. This reduces labor required to set the light environment.

In a setting system (B1) of a second aspect referring to the first aspect, the setting data includes time data. The time data is data relating to a time slot in which a lighting state of the lighting fixture (51) is switched and a time slot in which the shielding state of the shielding apparatus (52) is switched.

This configuration enables the light environment of the building to be switched depending on times.

In a setting system (B1) of a third aspect referring to the second aspect, the image data generator (14) is configured to generate, based on the time data, a moving image representing a time change of the light environment corresponding to the setting data of the building.

This configuration allows the user or the like to easily grasp the time change of the light environment of the building.

In a setting system (B1) of a fourth aspect referring to any one of the first to third aspects, the setting data includes grouping data which groups the plurality of facilities (5). The control data generator (15) is configured to generate the control data for collectively controlling two or more facilities (5), grouped into one group by the grouping data, of the plurality of facilities (5).

This configuration enables the plurality of facilities (5) to operate synchronously.

In a setting system (B1) of a fifth aspect referring to any one of the first to fourth aspects, the control data includes specifying data. The specifying data specifies a specific operation input portion (61) of a plurality of operation input portions (61) included in an operation terminal (6). The plurality of operation input devices (61) are each configured to receive a manual operation. The operation terminal (6) is configured to, when the manual operation is given to the specific operation input portion (61) specified by the specifying data, execute control corresponding to the control data over the plurality of facilities (5).

This configuration enables an operation input portion (61) of the plurality of operation input portions (61) which is to be used for the control to be specified.

A setting system (B1) of a sixth aspect referring to any one of the first to fifth aspects further includes a communicator (21). The communicator (21) is configured to transmit the control data to a control apparatus (41) installed in the building. The control apparatus (41) is configured to, when receiving the control data, execute the control corresponding to the setting data over the plurality of facilities (5).

With this configuration, the environment of the building can be controlled by using the setting system (B1) installed in a place different from the building.

A setting system (B1) of a seventh aspect referring to any one of the first to sixth aspects further includes an output section (communicator 11). The output section is configured to outputs the image data generated by rendering by the image data generator (14) to a display terminal (setting terminal 3). The display terminal is configured to display an image corresponding to the image data.

This configuration enables an image corresponding to the image data to be displayed by a display terminal different from the setting system (B1).

The configurations other than the first aspect are not configurations essential for the setting system (B1) and may thus accordingly be omitted.

A space creating system (A1) of an eighth aspect include: the setting system (B1) of any one of the first to seventh aspects; a design data generator (16); and a management data generator (17). The design data generator (16) is configured to generate design data in accordance with the three-dimensional data on the three-dimensional shape of the building. The design data is data on a selection and an arrangement of the plurality of facilities (5), the selection and the arrangement being made such that the environment of the building satisfies a prescribed environmental standard. The management data generator (17) is configured to generate management data in accordance with the design data and the facility data. The management data is data on management of the plurality of facilities (5). The image data generator (14) is configured to render the image data by using the design data as at least part of the facility data.

This configuration enables the setting system (B1), the design data generator (16), and the management data generator (17) to use the design data, the facility data, and the like in a shared manner. Thus, the design, setting, and management of the plurality of facilities (5) installed in the building can be done by the space creating system (A1) in a one-stop manner.

A setting method of a ninth aspect includes a setting input process, an image data generation process, and a control data generation process. The setting input process includes receiving an input of setting data on a setting of operation of a plurality of facilities (5). The plurality of facilities (5) are configured to be installed in a building and to establish an environment of the building. The plurality of facilities (5) include a lighting fixture (51) and a shielding apparatus (52). The shielding apparatus (52) is configured to automatically switch a shielding state with respect to outside light. The image data generation process includes rendering, based on model data, image data representing a light environment corresponding to the setting data of the building. The model data includes three-dimensional data on a three-dimensional shape of the building and facility data on the plurality of facilities (5) installed in the building. The control data generation process includes generating control data for executing control corresponding to the setting data over the plurality of facilities (5).

This configuration reduces labor required to set the light environment.

A program of a tenth aspect is a program configured to cause one or more processors to execute the setting method of the ninth aspect.

This configuration reduces labor required to set the light environment.

The aspects should not be construed as limiting, and various configurations (including variations of the setting system (B1) of the embodiment can be implemented by a setting method and a program.

REFERENCE SIGNS LIST

3 Setting Terminal (Display Terminal)
5 Facility
6 Operation Terminal
11 Communicator (Output Section)
13 Setting Input Section
14 Image Data Generator
15 Control Data Generator
16 Design Data Generator
17 Management Data Generator
21 Communicator
41 Control Apparatus
51 Lighting fixture
52 Shielding Apparatus
61 Operation Input Portion
A1 Space Creating System
B1 Setting System

The invention claimed is:

1. A setting system comprising:
a first processor configured to perform first operations comprising:
receiving an input of setting data on a setting of operation of a plurality of facilities, the plurality of facilities being configured to be installed in a building and to establish an environment of the building, the plurality of facilities including a lighting fixture and a shielding apparatus, the shielding apparatus being configured to automatically switch a shielding state with respect to outside light;
performing, based on model data, a simulation about a light environment corresponding to the setting data of the building and rendering image data representing a result of the simulation, the model data including three-dimensional data on a three-dimensional shape of the building and facility data on the plurality of facilities installed in the building;
outputting the image data to a display terminal configured to display an image corresponding to the image data;
receiving a confirming input of confirming a control corresponding to the setting data, after the image corresponding to the image data is displayed by the display terminal; and
generating control data for executing the control corresponding to the setting data over the plurality of facilities in response to a reception of the confirming input, wherein
the setting data includes time data on a time slot in which a lighting state of the lighting fixture is switched and a time slot in which the shielding state of the shielding apparatus is switched, and
the performing comprises performing the simulation about the light environment corresponding to the setting data of the building and generating a moving image, as the result of the simulation, representing a time change of the light environment based on the time data.

2. The setting system of claim 1, wherein
the setting data includes grouping data which groups the plurality of facilities, and
wherein the first operations further comprise generating the control data for collectively controlling two or more facilities, grouped into one group by the grouping data, of the plurality of facilities.

3. The setting system of claim 1, wherein the control data includes specifying data which specifies a specific operation input portion of a plurality of operation input portions included in an operation terminal, the plurality of operation input portions each being configured to receive a manual operation, and the operation terminal is configured to, when the manual operation is given to the specific operation input portion specified by the specifying data, execute the control corresponding to the control data over the plurality of facilities.

4. The setting system of claim 1, wherein the first operations further comprise transmitting the control data to a control apparatus installed in the building, and the control apparatus is configured to, when receiving the control data, execute the control corresponding to the setting data over the plurality of facilities.

5. A space creating system comprising:

the setting system of claim 1; and a second processor configured to perform second operations comprising:

generating design data in accordance with the three-dimensional data on the three-dimensional shape of the building, the design data being data on a selection and an arrangement of the plurality of facilities, the selection and the arrangement being made such that the environment of the building satisfies a prescribed environmental standard; and generating management data in accordance with the design data and the facility data, the management data being data on management of the plurality of facilities, wherein the first operations comprise rendering the image data by using the design data as at least part of the facility data.

6. A setting method comprising:

receiving an input of setting data on a setting of operation of a plurality of facilities, the plurality of facilities being configured to be installed in a building and to establish an environment of the building, the plurality of facilities including a lighting fixture and a shielding apparatus configured to automatically switch a shielding state with respect to outside light;

performing, based on model data, a simulation about a light environment corresponding to the setting data of the building and rendering image data representing a result of the simulation, the model data including three-dimensional data on a three-dimensional shape of the building and facility data on the plurality of facilities installed in the building;

outputting the image data to a display terminal configured to display an image corresponding to the image data;

receiving a confirming input of confirming a control corresponding to the setting data, after the image corresponding to the image data is displayed by the display terminal; and generating control data for executing the control corresponding to the setting data over the plurality of facilities in response to a reception of the confirming input, wherein the setting data includes time data on a time slot in which a lighting state of the lighting fixture is switched and a time slot in which the shielding state of the shielding apparatus is switched, and the performing comprises performing the simulation about the light environment corresponding to the setting data of the building and generating a moving image, as the result of the simulation, representing a time change of the light environment based on the time data.

7. A non-transitory computer-readable storage medium having stored thereon a computer program configured to cause one or more processors of the computer to execute the setting method of claim 6.

8. A setting system comprising:

a first processor configured to perform first operations comprising:

receiving an input of setting data on a setting of operation of a plurality of facilities, the plurality of facilities being configured to be installed in a building and to establish an environment of the building, the plurality of facilities including a lighting fixture and a shielding apparatus, the shielding apparatus being configured to automatically switch a shielding state with respect to outside light;

performing, based on model data, a simulation about a light environment corresponding to the setting data of the building and rendering image data representing a result of the simulation, the model data including three-dimensional data on a three-dimensional shape of the building and facility data on the plurality of facilities installed in the building; and generating control data for executing the control corresponding to the setting data over the plurality of facilities, wherein the setting data includes time data on a time slot in which a lighting state of the lighting fixture is switched and a time slot in which the shielding state of the shielding apparatus is switched, and the performing comprises performing the simulation about the light environment corresponding to the setting data of the building and generating a moving image, as the result of the simulation, representing a time change of the light environment based on the time data.

* * * * *